(12) United States Patent
Dils et al.

(10) Patent No.: US 6,532,677 B1
(45) Date of Patent: Mar. 18, 2003

(54) MEASURING APPARATUS FOR PLANER

(75) Inventors: Jeffrey M. Dils, Chandler, AZ (US);
Daniel B. Nelson, Chandler, AZ (US);
John E. Nemazi, Bloomfield Hills, MI (US)

(73) Assignee: One World Technologies Limited (BM)

( * ) Notice: Subject to any disclaimer, the term of this patent is extended or adjusted under 35 U.S.C. 154(b) by 0 days.

(21) Appl. No.: 09/599,267

(22) Filed: Jun. 22, 2000

(51) Int. Cl.⁷ .............................. G01B 3/20; G01B 3/50
(52) U.S. Cl. ................ 33/501.05; 33/501.45; 33/679.1
(58) Field of Search ............... 33/626, 628, 501.05, 33/630, 633, 641, 545, 571, 573, 501.08, 501.06, 501.45, 679.1, 562, 567, 1 BB

(56) References Cited

U.S. PATENT DOCUMENTS

| | | | | |
|---|---|---|---|---|
| 489,584 A | * | 1/1893 | Havener | 33/562 |
| 933,992 A | * | 9/1909 | Ketchum | 33/679.1 |
| 1,638,885 A | * | 8/1927 | Shea | 33/567 |
| 2,722,747 A | * | 11/1955 | Fritz | 33/567 |
| 2,981,005 A | * | 4/1961 | Moe | 33/679.1 |
| 3,209,463 A | * | 10/1965 | Schorr | 33/679.1 |
| 3,718,168 A | * | 2/1973 | Berends | 144/117.1 |
| 3,785,416 A | | 1/1974 | Anthony | |
| 4,090,302 A | * | 5/1978 | Bollmer | 33/567 |
| 4,150,488 A | * | 4/1979 | Behnke | 33/567 |
| 4,584,774 A | * | 4/1986 | Link | 33/202 |
| D284,286 S | * | 6/1986 | Pioch et al. | D15/127 |
| 4,852,257 A | | 8/1989 | Moore | |
| D306,171 S | * | 2/1990 | Kronthaler | D15/127 |
| 5,253,427 A | * | 10/1993 | Bartlett | 33/501.08 |
| 5,390,425 A | | 2/1995 | Gilberts | |
| 5,396,938 A | | 3/1995 | Cannaday | |
| 5,725,035 A | | 3/1998 | Shadeck | |
| 5,758,558 A | | 6/1998 | Squires | |
| 5,795,113 A | | 8/1998 | Wixey et al. | |
| 5,988,239 A | * | 11/1999 | Chen | 144/129 |

* cited by examiner

Primary Examiner—Diego Gutierrez
Assistant Examiner—Yaritza Guadalupe
(74) Attorney, Agent, or Firm—Brooks & Kushman P.C.

(57) ABSTRACT

A molded limit gauge for measuring workpiece thicknesses. The limit gauge includes a body having one or more elongate ridges extending longitudinally therealong. Each ridge has a plurality of notches extending laterally through its upper portion. Each notch has a unique longitudinal dimension that is uniform. In a first preferred embodiment of the invention, the bottom surface of each notch and the land between each notch is horizontally flat. In a second preferred embodiment, each of these surfaces has a configuration of a laterally convex curve. The limit gauge body is configured such that it can be mounted atop a planing machine. So mounted, it can function as a structural top of the planing machine. Measurement of a board thickness is accomplished by attempting to slide the board through notches that appear to match its thickness. A range of board thickness is defined between the indicated sizes of two adjacent notches that respectively allow and do not allow passage of the board through. When a number of different workpieces, such as boards, are to be planed, they can readily be measured and sorted into similarly sized groups before being planed so that a minimum number of planing machine adjustments need be made. A third embodiment includes jaws that extend into the notches. The jaws are resiliently biased against workpieces inserted into notches. Their positions are indicated on a dial indicator to facilitate determining workpiece dimensions that differ somewhat from those of the notches.

15 Claims, 5 Drawing Sheets

MEASURING APPARATUS FOR PLANER

TECHNICAL FIELD

The present invention relates generally to limit gauges that measure workpiece thicknesses and more particularly to limit gauges that are disposed on machines to measure workpieces that are to be planed by the machines.

BACKGROUND ART

Gauges that indicate the setting of a machine for planing a workpiece, such as a board, to a desired thickness are known in the art. Such gauges are commonly mounted on an external or at least visible surface of planing machines. These gauges usually indicate the height of planing blades within the machine and thus the thickness of a workpiece only after it has been planed. One could use this gauge to determine the preplaned thickness of a workpiece by inserting the workpiece beneath the blades, lowering the latter until they make contact with the upper surface of the workpiece, and reading the gauge. Of course, the gauges have not been designed for this purpose and would obviously be far less efficient than would simpler means such as hand-held scales or calipers.

DISCLOSURE OF INVENTION

An object of the present invention is to provide a limit gauge that is mountable on a planing machine and that provides means for quickly, easily and conveniently measuring the thicknesses of workpieces such as boards.

Another object is to provide a limit gauge that requires minimal, if any, material in addition to that required to fabricate a machine on which it is disposed.

A further object is to provide a limit gauge that is an integral part of an element of the combination of the machine.

Yet another object is to provide a limit guide having permanently sized notches that indicate a plurality of set maximum material thicknesses and a slidable member for indicating intermediate thicknesses.

A feature of the present invention is that the limit gauge is molded as an integral part of the combination of the elements of the machine.

Another feature is that the generally horizontal surfaces of the limit gauge over which workpieces are slid are convexly curved.

Still another feature is that indications of sizes of individual measuring notches are located proximate each respective notch.

A feature of another preferred embodiment of the limit gauge is that a slidable member is slidably disposed on the limit gauge such that jaws thereof extend into respective notches to effectively vary their dimensions when the slidable member position is shifted along the limit gauge.

A feature of still another preferred embodiment of the limit gauge is that it is readily separable from the planing machine, thus allowing the former to be used to measure workpieces at a distance from the latter.

An advantage of the present invention results from the fact that, since the limit gauge is molded as an integral part of a molded top of the machine, and a top is required anyway, little if any additional material is required to include the limit gauge and no machining costs are incurred in the gauge's fabrication.

An additional advantage is that the convexly curved surfaces of the limit gauge minimize the areas of contact between workpieces and the surfaces, thus facilitating the sliding of workpieces over the surfaces.

Another advantage is that one preferred embodiment of the limit gauge has no moving parts and requires no adjusting.

Still another advantage is that the limit gauge position and configuration make the limit gauge always readily available and easy to use.

Yet another advantage is that one preferred embodiment of the limit gauge includes a notch the longitudinal dimension of which is adjustable.

Another advantage is that one preferred embodiment of the limit gauge is separable from the planing machine, allowing manual measurement of workpieces without having to bring an unwieldy workpiece to the limit gauge.

In realizing the aforementioned and other objects, features and advantages, the limit gauge of the present invention includes an elongate body extending in a longitudinal direction. The body has at least one elongate ridge extending longitudinally along the top thereof. A plurality of laterally extending notches are defined in an upper portion of the at least one ridge. Each notch has a mutually different but uniform longitudinal dimension to facilitate measuring a workpiece thickness by attempting to slide, and sliding, the workpiece through adjacent notches.

The bottom surface of each of the plurality of notches is convexly curved in a lateral direction to facilitate the free passage of workpieces of appropriate thicknesses through the notches. The lands between adjacent notches of the plurality of notches are also convexly curved in a lateral direction to facilitate sliding workpieces toward a selected notch.

The limit gauge is preferably formed of structural foam, and the body is also formed as a top in a housing for a planing machine. The longitudinal dimension of each of the plurality of notches is indicated by characters disposed proximate each respective notch.

The objects, advantages and features of the present invention are readily apparent from the following detailed description of the best mode for carrying out the invention when taken in connection with the accompanying drawings.

BRIEF DESCRIPTION OF DRAWINGS

A more complete appreciation of the invention and many of the attendant advantages thereof may be readily obtained by reference to the following detailed description when considered with the accompanying drawings in which like reference characters indicate corresponding parts in all the views, wherein.

BEST MODE FOR CARRYING OUT THE INVENTION

Figure 1:
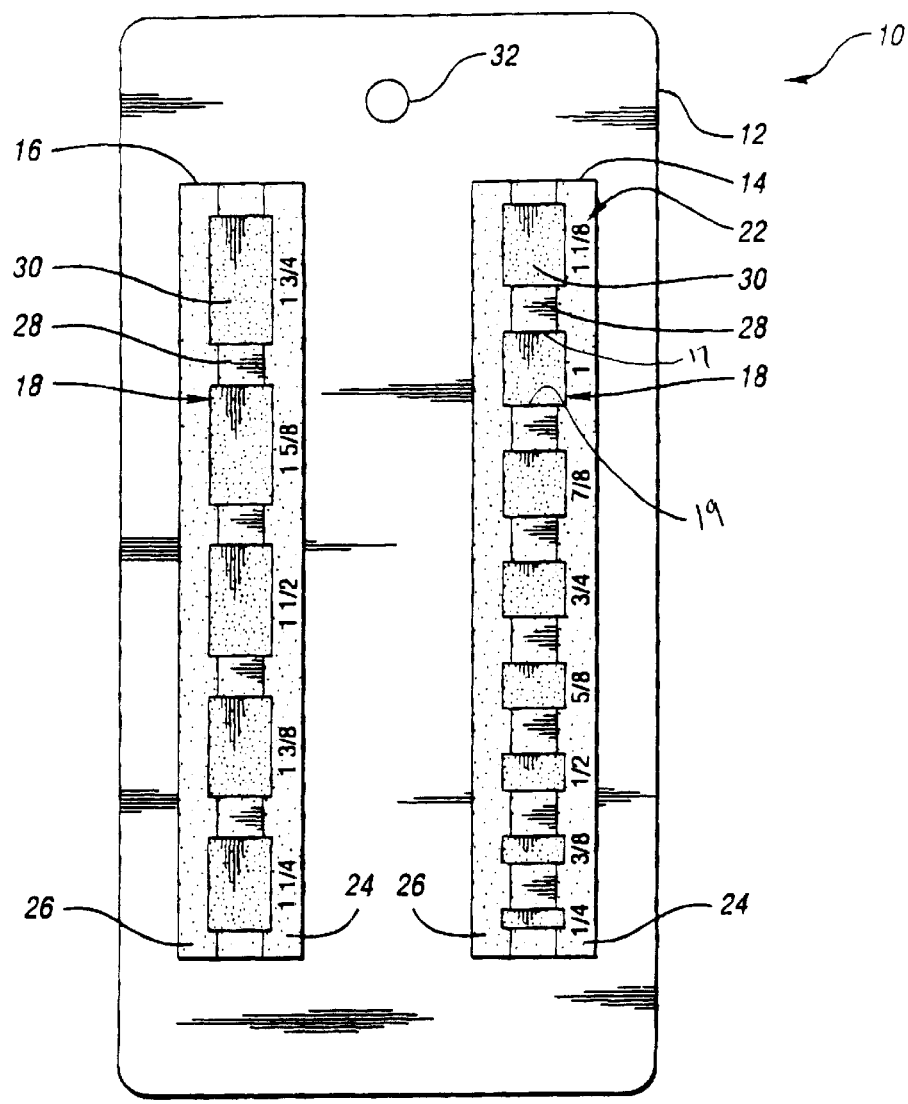
FIG. 1 is a plan view of a first preferred embodiment of a limit gauge of the present invention.

FIG. 1 of the drawing shows a plan view of a first preferred embodiment of a limit gauge, generally indicated by reference numeral 10, of the present invention. The limit gauge 10 includes an elongate body 12 that extends in a longitudinal direction. A first ridge 14 is disposed atop the body 12 and also extends in the longitudinal direction. Preferably, there is a second ridge 16 disposed atop the body 12 and extending generally parallel to and laterally spaced from the first ridge 14.

The limit gauge 10 is formed by a molding process such as injection molding, die casting or blow molding and is preferably made by injection molding structural foam. The ridges 14 and 16 are preferably molded with the body 12 but are molded independently if the limit gauge is to be used independently of a planing machine. First and second embodiments of the limit gauge 10 have no moving parts and require no adjustment. A plurality of notches, generally indicated by reference numeral 18, extend laterally through an upper portion of the ridges 14 and 16.

Figure 5:
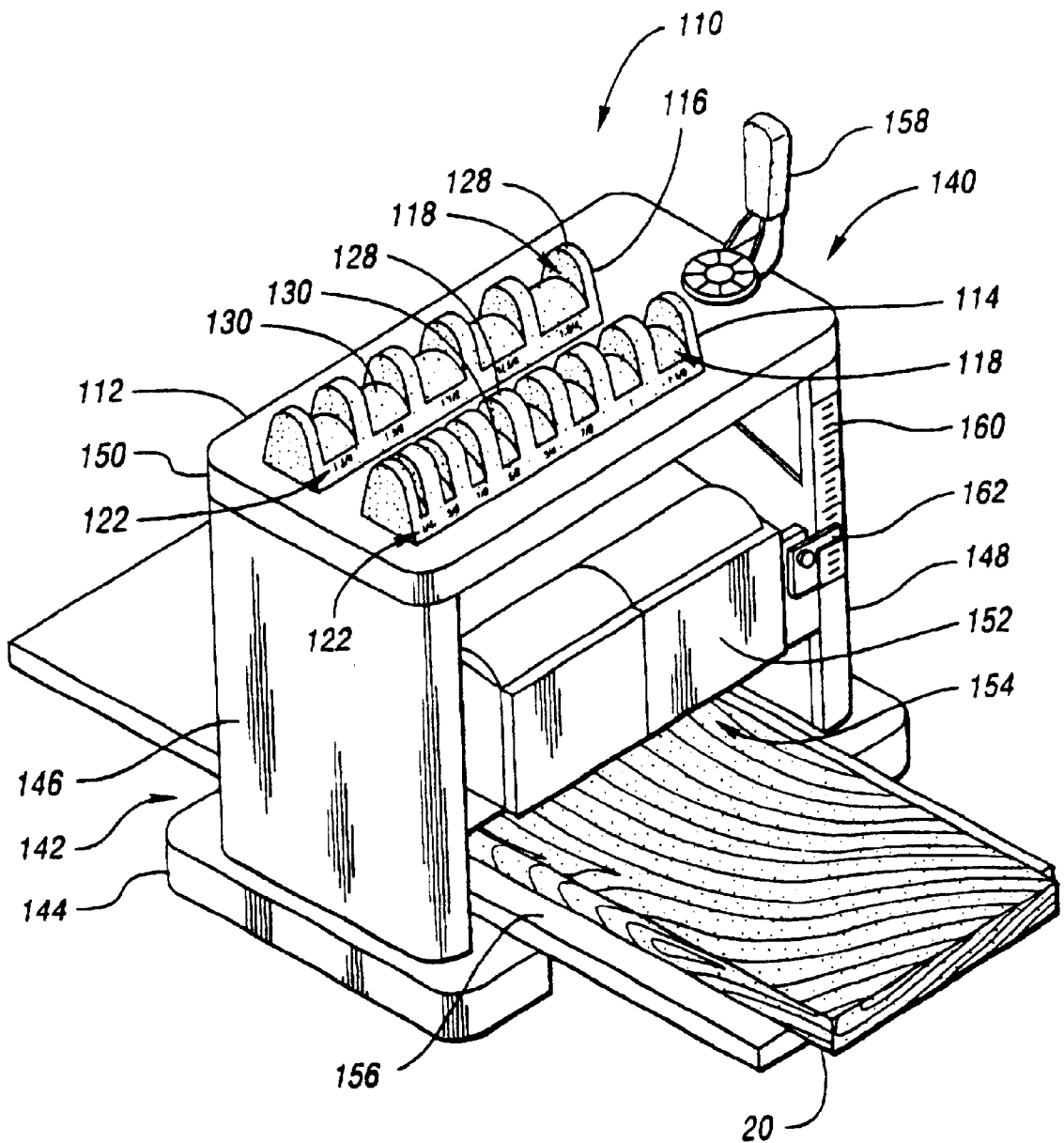
FIG. 5 is a perspective view of a typical planing machine that includes the second preferred embodiment of the limit gauge of FIGS. 3 and 4.

As shown in FIG. 1, each of the notches 18 has a mutually different longitudinal width dimension defined between an adjacent pair of laterally spaced face positions 17 and 19. The longitudinal dimension of each notch 18, however, is uniform. The longitudinal dimensions correspond with those commonly used when planing boards and other workpieces 20 (FIG. 5). These dimensions are generally indicated by characters 22 disposed proximate each respective notch.

Figure 2:
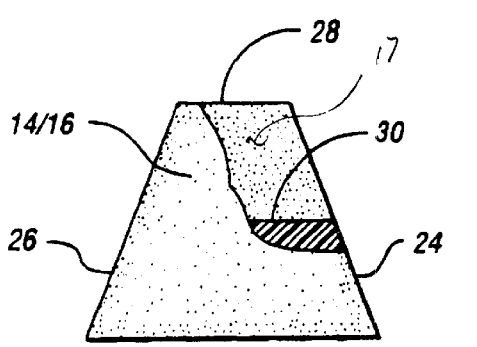
FIG. 2 is an end view of a portion of the limit gauge of FIG. 1 and is partially broken away and in section to reveal the configuration of a portion thereof.

FIG. 2 of the drawing represents an end view of the ridges 14 and 16 (FIG. 1) of a first preferred embodiment of the present invention. Each ridge 14 and 16 has sides 24 and 26 that converge toward a land 28 formed atop each ridge 14 and 16. A portion is partially cut away and shown in cross-section to illustrate the bottom surface 30 of a notch 18. Both the land 28 and the bottom surface 30 of the notch 18 are horizontally flat.

Figure 3:
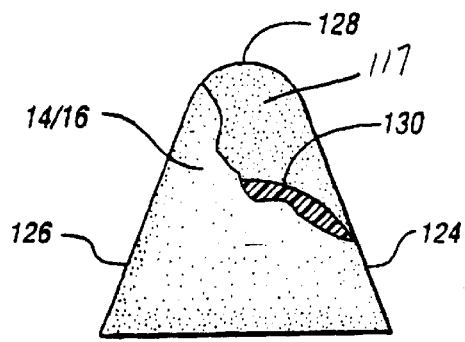
FIG. 3 is a view similar to that of FIG. 2, wherein a second preferred embodiment of the limit gauge has an alternative cross-sectional configuration.
Figure 4:
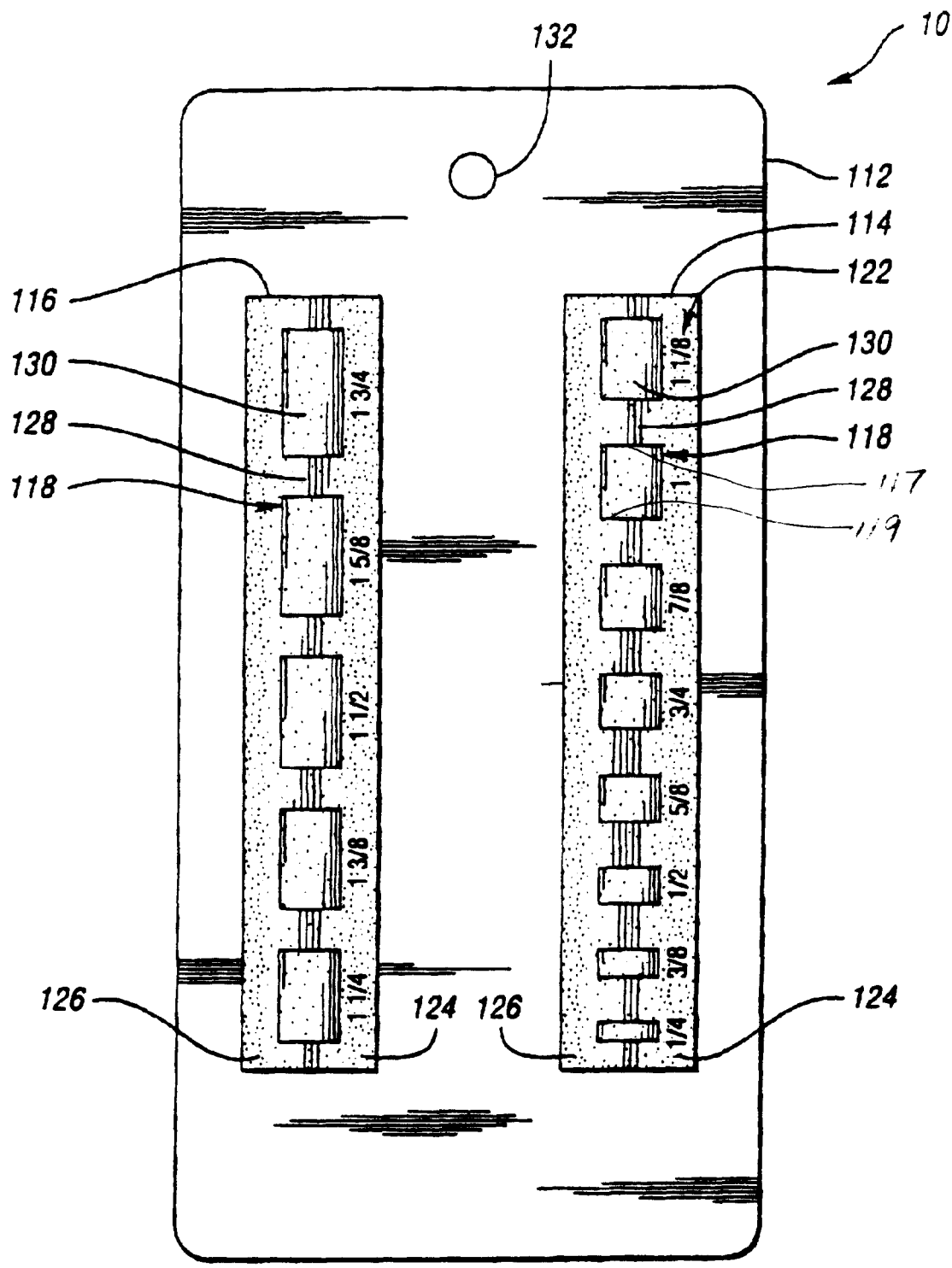
FIG. 4 is a plan view similar to that of FIG. 1 but showing the limit gauge of the second preferred embodiment.

FIG. 3 of the drawing represents an end view of the ridges 114 and 116 (FIG. 4) of a second preferred embodiment of the present invention. Each ridge 114 and 116 has sides 124 and 126 that converge toward a laterally rounded top 128 of each ridge 114 and 116 (FIG. 4). A portion (partially cut away and shown in cross-section) indicates the bottom surface 130 of a notch 118. Both the top 128 and the bottom surface 130 of the notch 118 are convexly curved in a lateral direction. These curvatures facilitate the free passage of workpieces 20 of appropriate thicknesses through the notches and facilitate the sliding of workpieces 20 toward a selected notch.

FIG. 4 of the drawing shows a plan view of a second preferred embodiment of the present invention. It is similar to FIG. 1 except that the bottoms 130 of notches 118 and the spaces 36 therebetween are, as shown in detail in FIG. 3, rounded rather than being flat, as shown in FIG. 2. The details of FIG. 4 bear reference numerals that are similar to those in FIG. 1 except for being greater by 100. The description of the limit gauge 110 in FIG. 4 is the same as that of the limit gauge 10 in FIG. 1 except for the reference numerals (which are those of FIG. 1 plus 100); therefore, for the sake of brevity, the description will not be needlessly repeated.

The thickness range of a workpiece 20 (FIG. 5) such as a board can be determined by visually estimating its thickness, attempting to slide it through a notch 118 that appears to be a bit too small, and trying progressively larger notches until one allows the workpiece to pass through. An alternative method, of course, is to begin with notches that are large enough to admit the workpiece and progress toward smaller notches. A range of workpiece thicknesses is defined by the indicated sizes of the two adjacent notches that respectively allow and do not allow passage of the workpiece 20.

Using this method facilitates sorting a number of workpieces 20 into groups that have thicknesses within common ranges. Once the workpieces 20 have been so grouped, planing machine cutter height need be set only once per pass for each group of sorted workpieces 20 (FIG. 5), thus making a planing operation involving a number of workpieces of various thicknesses more efficient.

FIG. 5 of the drawing represents a typical planing machine, generally indicated by reference number 140. The planing machine 140 includes a housing, generally indicated by reference numeral 142, having a base 144, a left side 146, a right side 148 and a top 150. The top 150 is the limit gauge 110. Having the limit gauge 110 serve as the top 150 not only places the former in a quickly accessible and convenient location for measuring workpieces 20; it also minimizes the amount, weight and cost of material required to fabricate a planing machine 140 that includes a limit gauge 110. Mounted within the housing 142 is a cutter assembly 152, a workpiece opening, generally indicated by reference numeral 154, being defined between the cutter assembly 152 and a support surface 156, which is disposed atop the base 144.

A rotatable crank 158 is disposed upon the top 150, the top 150 shown being the limit gauge 110 of the present invention. When operated, the crank 158 rotates an adjustment shaft (not shown) through an adjustment shaft aperture 132 (FIG. 4). A portion of the adjustment shaft is configured as a worm gear and provides a portion of the cutter assembly support. When rotated by the crank 158, the worm gear raises and lowers the cutter assembly 152, thereby respectively increasing and decreasing the vertical dimension of the workpiece opening 154. A scale 160 is mounted on the right side 148 of the housing 142. A pointer 162 is mounted on the cutter assembly 152 and moves vertically therewith as the height of the latter 152 is adjusted. The scale 160 has marks thereon with which the pointer 162 cooperates to indicate thicknesses to which workpieces 20 fed through the planing machine 140 are to be planed.

Figures 6, 7:
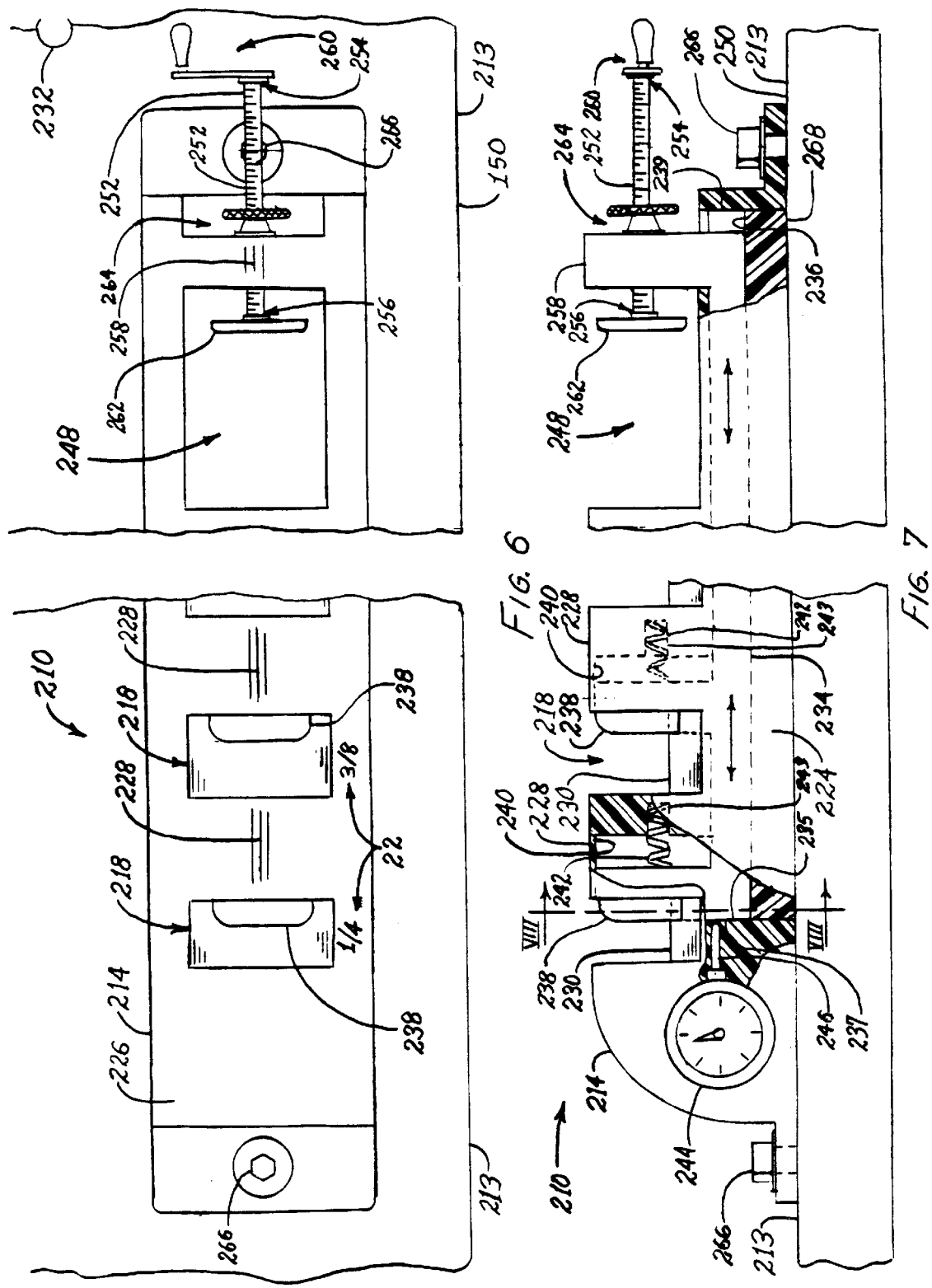
FIG. 6 is a plan view of one ridge of a third preferred embodiment of the limit gauge.
FIG. 7 is a side view, partially broken away and in section, of the ridge of FIG. 6.

FIGS. 6 and 7 of the drawing respectively show a plan and a side view of a ridge of a third preferred embodiment of the present invention. The ridge 214 is similar to that 114 shown in FIG. 4 except that it includes additional elements that provide for a more accurate measurement of workpieces having dimensions differing somewhat from those of the notches.

Figure 8:
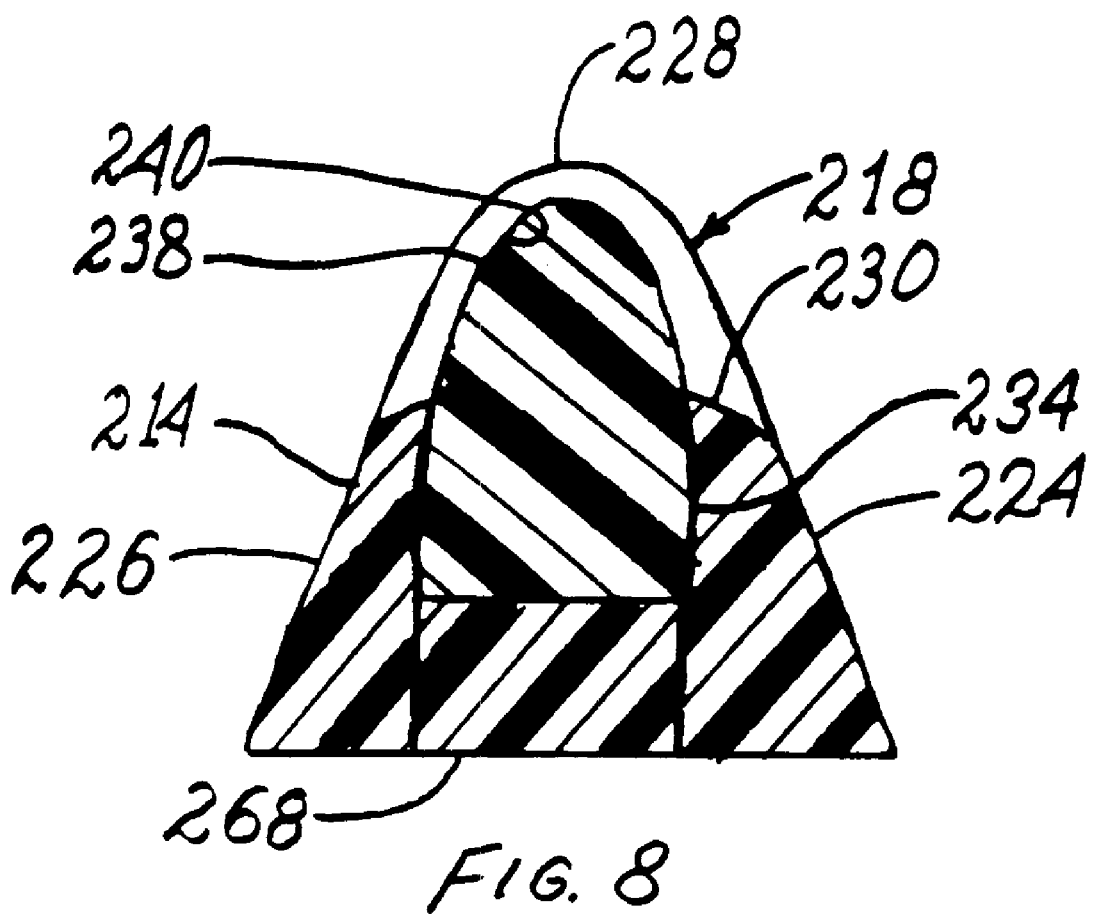
FIG. 8 is a sectional view of the ridge taken along the line VIII—VIII of FIG. 7.

As shown in detail in FIG. 7, an elongate slidable member 234 having a longitudinally extending portion is disposed within an elongate slot 236 in the stationary ridge member 214. The elongate slot 236 has an extended end 237 and a retracted end 239, and the elongate slidable member 234 is guided by the elongate slot 236 therebetween. The slidable member 234 includes a plurality of jaws 238 that extend upwardly therefrom. Each jaw 238 resides within a jaw recess 240 disposed below a respective ridge land 228, and the jaw 238 moves with the slidable member 234 so that a portion of each jaw 238 can be alternately moved into and partially out of its respective jaw recess 240. The distance to which a jaw 238 can be extended from its respective jaw recess 240 is limited by a stop 235, which is preferably formed at the extended end 237 of the elongate slot 236. The jaws 238 are urged by a resilient biasing member 242 in the direction of the stop 235. The resilient biasing member may be any of a number of known resilient biasing devices applying force upon the slidable member 234, but it is preferably a plurality of squared helical compression springs 242. The springs 242 are located within spring recesses 243, which are generally axially aligned with the jaw recesses. A view, partially in section and showing the ridge 214, a jaw recess 240, and the elongate slidable member 234 is provided in FIG. 8 of the drawing. A removable access portion 268, which provides access during construction of the limit gauge to the elongate slot 236 for inserting the slidable member 234, is shown in FIGS. 7 and 8.

A jaw position indicator, preferably a dial indicator, 244 is mounted proximate the extended end 237 of the elongate slot 236 toward which the jaws 238 of the slidable member 234 are biased. The dial indicator 244 has a sensing rack 246 extending therefrom that contacts the slidable member 234 and, based on its position, indicates the amount of extension of the jaws 238 beyond the jaw recesses 240 in which they reside. The tops and sides of each jaw 238 are rounded to facilitate the insertion of a workpiece 20 into a notch 218 while forcing the jaw 238 into its respective jaw recess 240. The difference between the notch size and the workpiece thickness can be read from the dial indicator 244 and compared to the notch size to determine workpiece thickness relatively accurately.

A large auxiliary notch 248 is also provided at the end of the ridge 214 opposite the dial indicator 244. This notch 248 is provided with a screw 252, having a crank end, generally indicated by reference numeral 254, and a pressure-plate end, generally indicated by reference numeral 256, threaded through a portion of the ridge 214 below a land 258. A crank handle, generally indicated by reference numeral 260, is affixed to the crank end 254 of the screw 252, and a pressure plate 262 is rotatably mounted to the pressure-plate end 256 thereof. By turning the crank handle 260, the effective size of the auxiliary notch 248 can be adjusted to form a limit gauge that can be set to various sizes. A manually adjustable locking mechanism, generally indicated by reference numeral 264 and shown as a locking collar, is threaded on the screw 252 and can be rotatably advanced against the ridge 214 below the land 258 to lock the screw 252 in place after the pressure plate 262 has been positioned.

FIGS. 6 and 7 also show a fourth preferred embodiment of the present invention. The ridge 214 including the limit gauge, generally indicated by the reference numeral 210, shown is detachable from the body 213 and can be used to measure workpieces 20 at a distance from the planing machine 140. Fastening members, such as bolts 266 or known quick-release devices (not shown), are used to fasten the ridge 214 to the body 213.

While embodiments of the invention have been illustrated and described, it is not intended that these embodiments illustrate and describe all possible forms of the invention. Rather, the words used in the specification are words of description rather than limitation, and it is to be understood that various changes may be made without departing from the spirit and scope of the invention.

What is claimed is:

1. A planing machine for planing at least one of a pair of surfaces of a planar workpiece having at least one elongate marginal edge in order to obtain a desired workpiece thickness, the planing machine comprising:

a housing including a base, a left side, a right side and a top;

a cutter assembly cooperating with the base to define therebetween a workpiece opening for receiving the workpiece, the cutter assembly including a rotatably driven cutting head that extends into the workpiece opening to plane a workpiece as the workpiece is fed past the cutting head, the top of the housing including:

an elongate body extending in a longitudinal direction; and at least one elongate ridge member extending longitudinally along the top of the body, the at least one elongate ridge having an upper portion which forms a plurality of laterally extending spaced apart notches, each notch being defined by an adjacent pair of longitudinally spaced face portions and a bottom surface extending longitudinally therebetween, wherein the work piece is inserted on edge by an operator into one or more of the spaced apart notches to determine the thickness of the workpiece relative thereto.

2. The planing machine of claim 1, wherein at least one of the bottom surfaces of the plurality of notches are convexly curved in a lateral direction to minimize areas of contact between the marginal edge of the workpiece and the bottom surface of the selected notch to facilitate sliding of the workpiece there through.

3. The planing machine of claim 1, wherein the at least one elongate ridge comprises a pair of generally parallel laterally spaced apart ridges each defining a plurality of laterally extending longitudinally spaced apart notches.

4. The planing machine of claim 1, wherein the top of the housing is integrally molded forming the elongate body and the at least one ridge member defining the spaced apart notches as a unitary member.

5. The planing machine of claim 1, wherein the at least one elongate ridge member further comprises:

a stationary member;

a slidable member longitudinally shiftable relative to the stationary member; and a position indicator for measuring the relative orientation of the stationary and slidable members:

wherein at least one of the plurality of notches is defined by the stationary and slidable members with one of the adjacent pair of longitudinally spaced face portions located on each of the stationary and slidable members.

6. The planing machine of claim 5, further comprising:

a resilient biasing member urging the slidable member longitudinally relative to the stationary member to cause the adjacent pair of longitudinally spaced face portions to engage the workpiece.

7. The planing machine of claim 5, wherein the position indicator is a dial indicator.

8. The planing machine of claim 5, wherein the elongate ridge further comprises at least one adjustable notch, the at least one adjustable notch formed between a face associated with the stationary member and a face associated with a screw having a threaded portion threadingly cooperating with the stationary member.

9. The planing machine of claim 1 wherein the at least one elongate ridge member upper portion is convexly curved in a lateral direction to minimize the area of contact and to eliminate sharp corners enabling the planar workpiece to be passed across the elongate ridge to return the workpiece to the workpiece opening side of the planing machine for another planing pass.

10. A limit gauge for measuring the thickness of a planar work piece having at least one marginal edge, the limit gauge comprising:

an elongated body extending in a longitudinal direction; and at least one elongate ridge extending longitudinally along the top of the body, the at least one elongate ridge having an upper portion which forms a plurality of laterally extending spaced apart notches, each notch being defined by an adjacent pair of longitudinally spaced face portions and a bottom surface extending longitudinally therebetween to form a plurality of rectangle shaped notches of different widths, the bottom surfaces of at least one of the plurality of notches is convexly curved in a lateral direction to minimize contact with the marginal edge of the work piece to facilitate sliding the work piece through the selected notch, wherein the work piece can be inserted on edge by an operator into one or more of the spaced apart notches to determine the thickness of the planar work piece relative thereto.

11. A limit gauge for measuring the thickness of a planar work piece having at least one marginal edge, the limit gauge comprising:

an elongated body extending in a longitudinal direction; and at least one elongate ridge extending longitudinally along the top of the body, the at least one elongate ridge having an upper portion which forms a plurality of laterally extending spaced apart notches, each notch being defined by an adjacent pair of longitudinally spaced face portions and a bottom surface extending longitudinally therebetween to form a plurality of rectangle shaped notches of different widths, wherein the at least one elongate ridge member further comprises:

a stationary member, a slideable member longitudinally shiftable relative to the stationary member, a position indicator for measuring the relative orientation of the stationary and slideable members, wherein at least one of the plurality of notches is defined by the stationary and slideable members with one of the adjacent pair of longitudinally spaced face portions located on each of the stationary and slideable members; and wherein the work piece can be inserted on edge by an operator into one or more of the spaced apart notches to determine the thickness of the planar work piece relative thereto.

12. The limit gauge as defined by claim 11, wherein:

a resilient biasing member urging the slidable member longitudinally relative to the stationary member to cause the adjacent pair of longitudinally spaced face portions to engage the workpiece.

13. The limit gauge as defined by claim 11, wherein the position indicator is a dial indicator.

14. The limit gauge of claim 11, wherein the elongate ridge further comprises at least one adjustable notch, the at least one adjustable notch formed between a face associated with the stationary member and a face associated with a screw having a threaded portion threadingly cooperating with the stationary member.

15. The limit gauge of claim 11 wherein the at least one elongate ridge member upper portion is convexly curved to facilitate sliding the workpiece thereacross.

\* \* \* \* \*